United States Patent [19]

Pfost et al.

[11] 4,135,058
[45] Jan. 16, 1979

[54] DUAL TAPE TRANSPORT SYSTEM WITH RELATED METHOD AND MEANS FOR REDUCING CUEING TIME

[75] Inventors: Robert F. Pfost, Los Altos; William E. Seaman, Woodside; Chester W. Newell, San Jose, all of Calif.

[73] Assignee: Newell Research Corporation, Saratoga, Calif.

[21] Appl. No.: 758,816

[22] Filed: Jan. 12, 1977

[51] Int. Cl.² ............................................. H04M 1/64
[52] U.S. Cl. ......................... 179/6 R; 179/100.1 VC; 360/96; 360/92; 360/72
[58] Field of Search ................. 179/6 R, 100.1 VC; 360/13, 96, 92, 66, 63, 71, 72

[56] References Cited

U.S. PATENT DOCUMENTS

| | | | |
|---|---|---|---|
| 3,501,592 | 3/1970 | Waldman | 179/6 R |
| 3,640,479 | 2/1972 | Hata | 179/6 R |
| 3,713,039 | 1/1973 | Hashimoto | 179/6 R |
| 3,914,551 | 10/1975 | Hunt | 179/6 R |
| 3,943,292 | 3/1976 | Takazawa | 179/6 R |
| 4,032,712 | 6/1977 | Catto | 360/66 |

Primary Examiner—Bernard Konick
Assistant Examiner—Alan Faber
Attorney, Agent, or Firm—Allan R. Fowler

[57] ABSTRACT

A dual magnetic tape cartridge includes a first reel-to-reel tape wound between two coplaner hubs. A tape loop, extending between the hubs, is guided along a first path and across a tape head access opening. The second tape, in belt form, is guided along a second path and across the tape head access opening at a different level. A drive belt, frictionally engaging first tape peripheries on the hubs, is entrained over portions of a forward drive roller and over portions of two spaced rear idlers. The second tape is entrained over slightly smaller diameter portions of the drive roller and over other portions of the rear idlers to thereby also function as a tensioning belt for the drive belt, causing greater tension in drive belt portions engaging the first tape on the hub acting as the takeup hub than in other belt portions engaging tape on the other hub. Both tapes are mechanically interconnected and are always driven simultaneously since the second tape and drive belt are entrained over common elements and the drive belt drives the first tape. For extended length and recording time the second tape is festooned around a number of other tape guides, additionally, the tapes are mounted so that both are always driven across the tape head access opening in opposite directions. Also described is an associated automatic telephone answering apparatus in which the second, belted tape is the announcement tape and the first reel-to-reel tape is the message tape and in which counter record/playback travel of the tapes is used to reduce cueing time. Corresponding methods for reducing cueing time are described.

10 Claims, 12 Drawing Figures

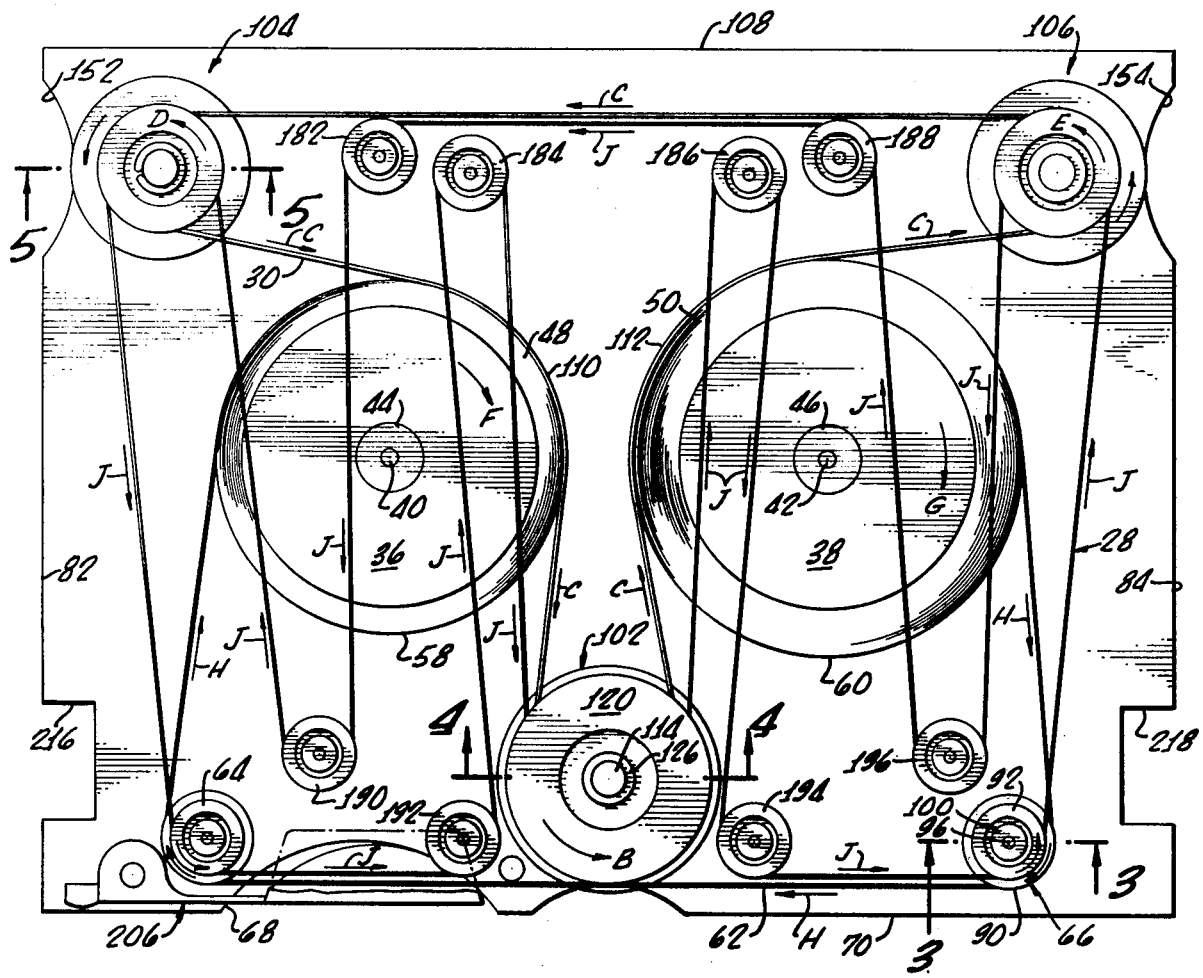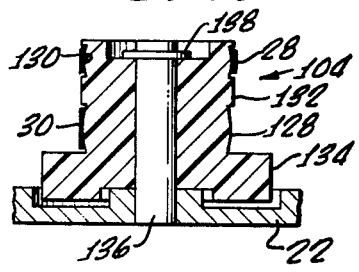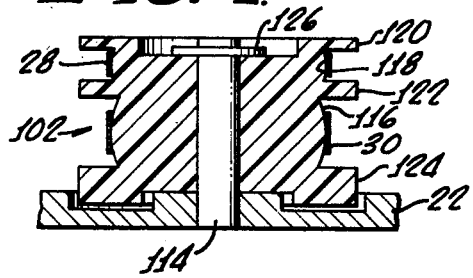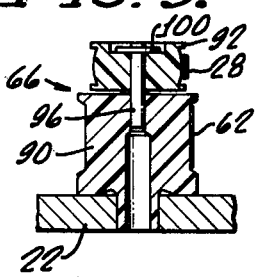

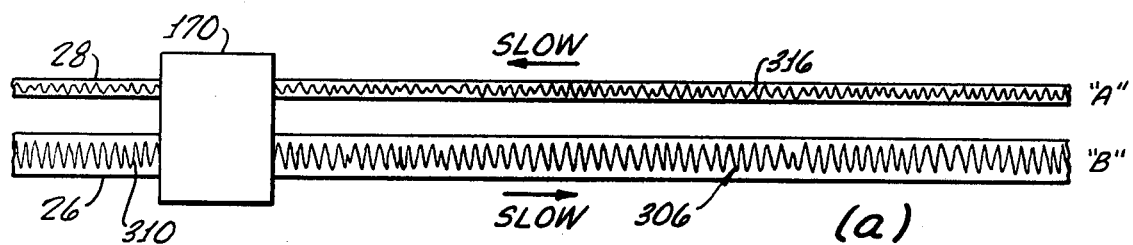
(a)
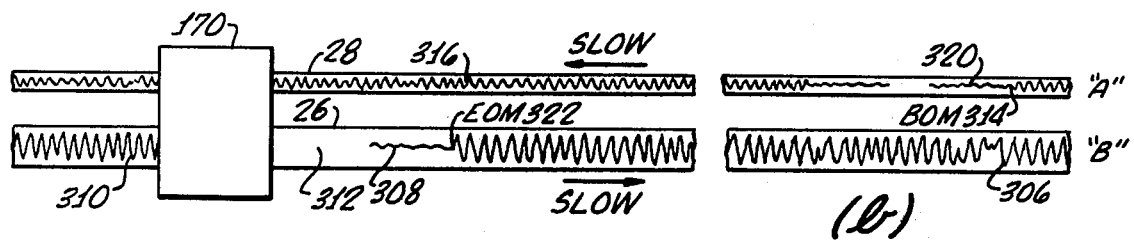
(b)
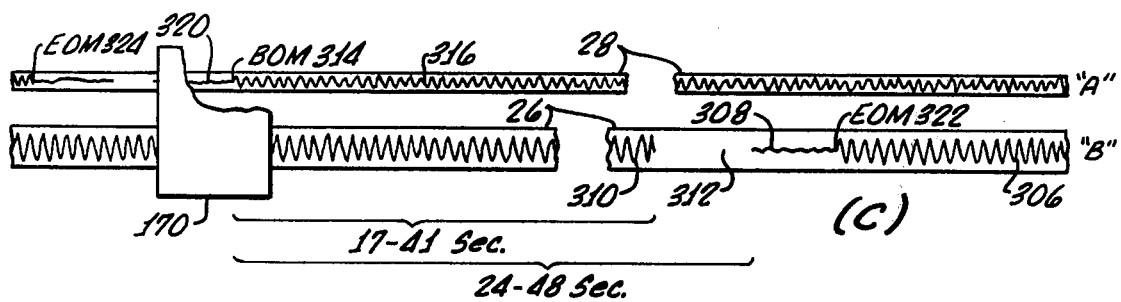
(c)
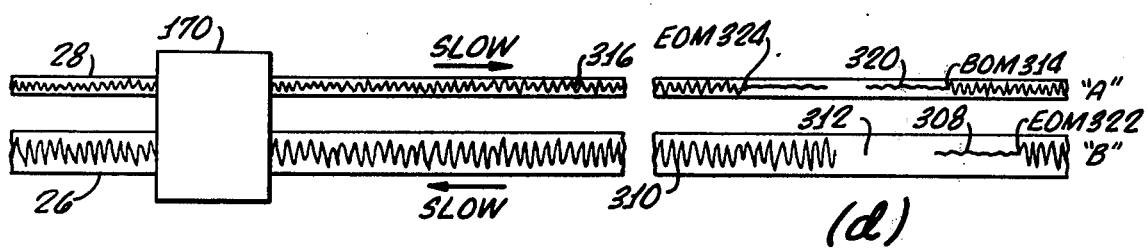
(d)
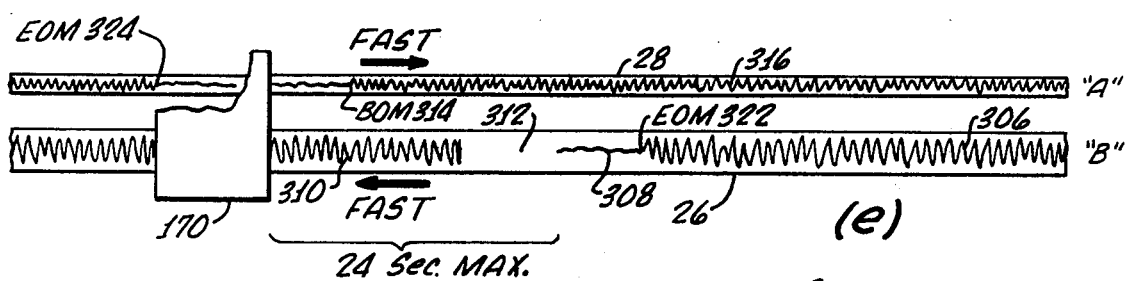
(e)
Fig. 11.

Fig. 12.

COMMENTS

ALL BLANKS IN TABLE ARE "0".

"X's" ARE DON'T CARE CONDITIONS

DUAL TAPE TRANSPORT SYSTEM WITH RELATED METHOD AND MEANS FOR REDUCING CUEING TIME

The present invention relates generally to the field of magnetic recording tape apparatus, and more particularly to dual recording tape cartridges and telephone answering equipment utilizing such cartridges.

Magnetic recording tapes have many uses including stereo systems, telephone answering apparatus, broadcast audio and video systems, business word processing equipment and electronic data processing (EDP) machines. Initially, bulk tape was used in most applications, but now preloaded tape cartridges or cassettes, because they provide quicker tape interchange, easier loading and greater tape protection, are usually preferred and have given rise to new machines and applications.

Most tape machines, such as audio or video systems use two or more record/playback channels on the same tape. Other apparatus needing more than one channel require two (or more) separate tapes. Typical of such apparatus are most automatic telephone answerers. To illustrate use of two tapes, when a caller reaches a telephone number controlled by an automatic answering apparatus, he is typically played a short announcement from one tape, usually in belt form, and is then instructed to leave a brief message which is recorded onto a separate reel-to-reel tape.

Use of two separate tapes is preferable over using a single tape, since with only a single tape a user must inconveniently record a number of spaced announcements, leaving fixed length gaps for caller messages. Caller messages exceeding the gap length are either cut off or erase part of the next announcement. If a caller leaves a short message or fails to leave a message, excessive delays for a user or listener may result.

Two separate magnetic tapes are also used by some types of EDP equipment, a belted tape providing instructions or functioning as a recirculating memory and a reel-to-reel tape providing data to be processed. Alternate use of a single tape with instructions recorded before the data is less satisfactory if the instructions must be reviewed during data processing.

However, tape systems using two separate tapes must provide separate transport for each tape, which results in increased system complexity and cost. Also the two associated but separate tapes may become separated or mixed up with other tapes.

In fixed, dual tape systems, wherein the two tapes are always kept in proper association, system flexibility is substantially less than when replaceable tapes are used. In telephone answering equipment, for example, frequent changing of announcements requires inconvenient rerecording on the fixed announcement tape; whereas, replaceable tapes can provide a library of different announcements. Also, fixed message tapes have limited message capability, since a returning user may have insufficient time to playback all the messages before leaving again and more messages may, in time, be given than can be recorded. Furthermore, fixed tape equipment must be used to playback messages and is out of service during playback.

One type of dual tape cartridge has been developed by the Plantronics Company for telephone answering equipment. Two stacked hubs receive the message tape and a tape loop between the hubs is guided past a tape drive position. A separate, belted announcement tape, festooned around a number of tape guides to provide an extended tape length, is separately guided past the drive position of the first tape. The two tapes are completely separate and each tape must be separately driven. To this end, a typical associated machine may provide a common tape drive capstan and two independently, selectively operated pinch rollers, one for each tape. This type of tape cartridges, in effect, functions as two separate tape cartridges.

Related type apparatus exist in which a magnetic tape and a photographic or microfilm strip or tape are both used. One example is sound motion pictures in which a magnetic tape is used for the sound track and a film strip is used for the picture track. If the magnetic tape is fixed to the film strip, a reduction in picture area results, but if the tape and film are separate, registration or coordinated movement between the two is difficult to achieve.

Because of these and other reasons improved, dual tape cartridges, and associated cartridge machines, are necessary. Particularly necessary are cartridges in which the tapes are interconnected for simultaneous transporting.

In accordance with our present invention, magnetic recording tape apparatus is provided for use with dual tape cartridges having a tape head access opening, separate first and second magnetic recording tapes, bilateral tape transport means for always causing simultaneous transport of the two tapes across the tape access opening at different levels, and an externally engageable drive member connected to the transport means. The magnetic recording tape apparatus comprises means for receiving the dual tape cartridge, reversible tape driver means having driver portions positioned for engaging the received cartridge drive member and tape head means having first and second tape head portions positioned in operative relationship, respectively, with portions of the received cartridge first and second tapes at the tape head access opening.

Control means, connected in operative relationship with the tape head means, controls operation of the tape driver means and tape head means in response to information received by at least one of the tape head portions from an associated cartridge tape.

More specifically, the apparatus is particularly adapted for use with dual tape cartridges in which the tapes are constrained to move in counter directions so that when either tape is advanced in a normal record/playback direction past its associated tape head, the other tape is transported in a reverse record/playback or "rewind" direction past its associated tape head.

Alternatively, instead of being adapted for use with a dual tape cartridge, the apparatus itself includes first and second tapes, the first tape being mounted in hub-to-hub (reel-to-reel) form and the second in endless loop form, each tape being capable of bidirectional movement. Associated control means control tape record/playback heads and direction of tape drive.

Means are also provided for recording pilot tone control signals on the tapes while messages are recorded thereon and for at least measured times after recording of the messages has stopped and for erasing a gap or measured length of the tape following the end of pilot tone control signals. Detection means, responsive to the pilot tones control signals, detect beginnings and ends of messages recorded on the tapes. The control means are responsive to the pilot tone control signals for controlling message recording and playback and for energizing and controlling the tape drive means.

The control means also, after a message has been played back in a forward direction from a second (announcement) tape, cause the drive means to transport a first (message) tape in a "reverse" record/playback direction to search for the pilot tone control signals at the end of the last recorded message.

After a next message has been recorded on the first tape, the second tape is transported in a reverse record/playback direction to search for the pilot tone control signals at the beginning of the announcement.

After the second tape announcement has been played to a caller, the first tape is at a position such that search for the end of the previous first tape caller message is from outside the message across the gap and towards the pilot tone trailer associated with such message. Because the message end is thus easily discriminated, the searching can be done at high speeds (and including all speeds up to high speeds) to minimize cueing time between end of the announcement and when a caller may start his message.

A corresponding method for reducing this cueing time is provided, the method comprising forming a tape cartridge having a first, reel-to-reel message recording tape and a second, endless loop announcement recording tape and mechanically constraining the two tapes always to be transported simultaneously whenever one is transported and always to be transported in opposite record/playback directions past a tape head access opening. After installing the cartridge in a tape transport apparatus having tape head means positioned at the tape head access opening and having means for bilaterally transporting the tapes in forward and reverse record/playback directions, an announcement is recorded on the second tape in the forward record/playback direction. After the announcement is completed the first tape is rewound to its beginning for recording an initial caller message is in the forward record/playback direction. Upon completion of the initial message, the apparatus is prepared for a next caller message by continuing transport of the first tape in a forward record/playback direction for a period of time ensuring that, after the announcement is played to the next caller, the end of the caller message will be beyond, in the forward record/playback direction, the tape head means.

At that point, the second tape is searched in the reverse record/playback (rewind) direction until the beginning of the announcement is found, further transporting the first tape in the forward record/playback direction. Upon finding the beginning of the announcement the tape transport is stopped to await a next call. Upon receipt of the next call, the second tape announcement is played in the forward record/playback direction causing transporting of the first tape in the reverse record/playback direction. At the end of the announcement, the first tape is still ahead of the last caller message and is searched in the reverse record/playback direction until the end of such message is found. The next caller is then cued to start giving his message. Searching at all speeds is readily enabled by a pilot tone which is recorded during, and for measured times before and after, the announcement and all caller messages and are recorded.

A better understanding of the present invention may be had from a consideration of the following detailed description, taken in conjunction with the accompanying drawings in which:

FIG. 2 is a plan view of the cartridge of FIG. 1 with the cover removed, showing arrangement of the tapes and drive belt and showing tape and belt mounting and guiding means;

FIG. 3 is a vertical sectional view along line 3—3 of FIG. 2, showing features of a front, corner guide for guiding the two tapes;

FIG. 4 is a vertical sectional view along line 4—4 of FIG. 2, showing configuration of a drive roller over which both the second tape and the drive belt are entrained;

FIG. 5 is a vertical sectional view along line 5—5 of FIG. 2, showing features of a rear corner idler over which both the second tape and a first tape drive belt are entrained;

FIG. 11 is a pictorial representation of the two tapes as used in the answering apparatus at different operational times, FIG. 11(a) showing the tapes while a message is being recorded on the tape functioning as a message tape, FIG. 11(b) showing the tapes after a pilot tone trailer and inter-record gap have been put on the message tape, FIG. 11(c) showing the two tapes "parked" awaiting a call, FIG. 11(d) showing the two tapes as an announcement is played to a caller from the tape functioning as an announcement tape, and FIG. 11(e) showing fast searching for the end of the previous message after the announcement has been given, and FIG. 12 is a microprocessor control table or truth table defining a microprocessor portion of the telephone answering apparatus.

Figure 1:
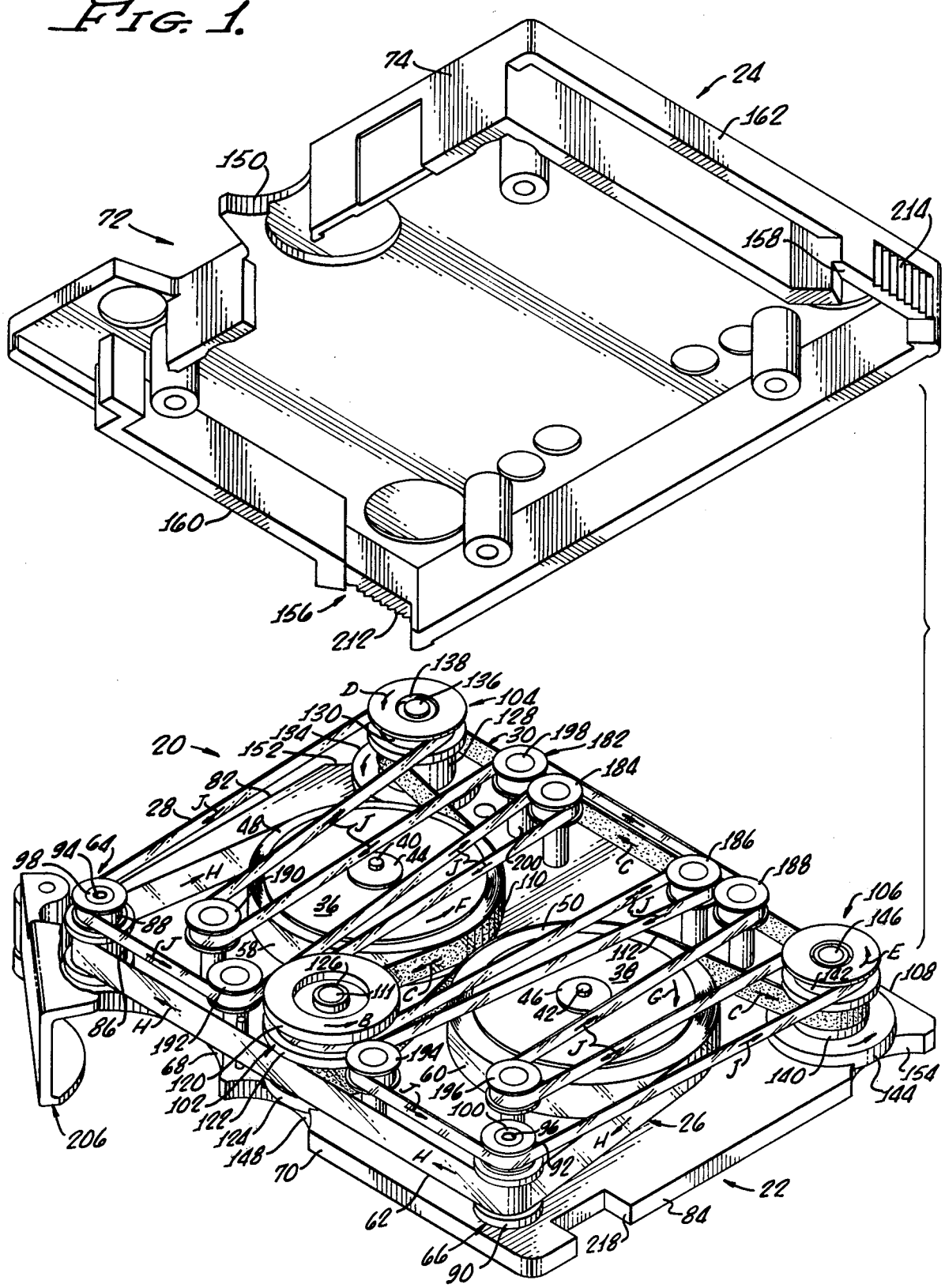
FIG. 1 is a partially exploded perspective drawing, showing features of a dual record-tape cartridge, including a first record-tape, a first tape drive belt and a second record-tape in endless belt form which also tensions the drive belt.

Referring now to the figures, and as best seen in FIG. 1, a dual tape cartridge or cassette 20 comprises generally a rigid base plate or frame 22, a removable cover 24, a first record-tape or web 26 in reel-to-reel form, a second record-tape or web 28 in loop or belt form and a first tape drive belt 30. As more particularly described below, the second tape 28 also functions as a tensioning belt for the drive belt 30 and hence for the tape 26; accordingly, both first and second tapes are mechanically interconnected and are always constrained to move simultaneously and under tension.

As used herein, the term "record-tape" is to be understood to include magnetic recording tape, photographic film strips and microfilm strips upon which information is, or may be, recorded in some appropriate manner. Also, the tapes 26 and 28 are not constrained to be of one type; and may be useful in some applications, one may be a magnetic recording tape and the other may be a photographic or microfilm strip. However, in the described configuration of the cartridge 20, both tapes may advantageously comprise magnetic recording tapes.

For receiving the first tape 26, first and second tape hubs 36 and 38, respectively, are rotatably mounted to the frame 22 on pivot pins 40 and 42, the hubs being constrained to their respective pivot pins by snap rings 44 and 46. Arranged in side by side, spaced relationship, the hubs 36 and 38 are coplaner and have parallel axis of rotation.

The first recording tape 26 has first end portions 48 wound onto the first hub 36 and second end portions 50 wound onto the second hub 38; for any division of the tape therebetween, there exists an exposed first peripheral tape surface 58 of the tape first portion 48 on the first hub, an exposed second peripheral tape surface 60 of the tape second portion 50 on the second hub, and a tape loop 62 extending therebetween.

Spaced apart first and second tape guides 64 and 66, respectively, are provided for transporting and guiding the tape loop 62 across an arcuate recess 68 formed in a front edge 70 of the frame 22 and a corresponding opening 72, formed in a front edge 74 of the cover 24. Both the recess 68 and opening 72 are configured for enabling tape head access to the tapes 26 and 28. The first tape guide 64 is positioned at a front corner defined by the frame front edge 70 and a frame first side edge 82 (see also FIG. 2); the second guide 66 is positioned at an opposite front corner, defined by the frame front edge 70 and a frame second side edge 84.

A generally cylindrical lower portion 86 of the first guide 64 guides the tape loop 62 of the first tape 26 and a separated, generally cylindrical upper portion 88, guides the second tape 28 (FIG. 3). The second guide 66 is identically formed having a tape loop guiding lower portion 90 and a second tape guiding upper portion 92. As shown, both the lower portions 86 and 90 are nonrotating; whereas, both the upper portions 88 and 92 comprise rotatably mounted rollers. The portions 86, 88 and 90, 92 are mounted, respectively, on pins 94 and 96, and are retained thereon by snap rings 98 and 100. Peripheries of the rotating upper portions 88, 92 may be slightly crowned, or convex, to cause centering of the tapes 26 and 28 on the rollers during tape transport in a known manner.

Driving or transporting of the tape loop 62 across the frame recess 68 and the cover opening 72 is by the drive belt 30, in a generally conventional, peripheral drive manner. To this end, the drive belt 30, which for some applications might be another record-tape, is entrained over a drive roller 102 and first and second idlers or idler rollers 104 and 106, respectively, to be coplaner with the first tape 26. The drive member 102 is rotatably mounted to the frame 22 at a forward, central region near the front edge 70 and the idlers 104 and 106, are rotatably mounted at opposite rear corners of the frame defined by frame side edges 82 and 84, respectively, and a frame rear edge 108.

Relative positioning of the drive roller 102 and the two idlers 104 and 106 causes, regardless of division of the first tape 26 between the first and second hubs 36 and 38, a first unsupported portion 110 of the drive belt 30 always to be in frictional driving engagement with the first tape peripheral surface 58 and a second drive belt unsupported portion 112 always to be in frictional driving engagement with the second peripheral tape surface 60.

Tension in the drive belt 30 prevents slippage between the belt portions 110 and 112 and the associated tape surfaces 58 and 60, thereby enabling transport of the tape 26 between the two hubs 36 and 38 whenever the drive belt is moved, for example, by the drive roller 102.

Specifically, as seen in FIG. 4, the drive roller 102, which is rotatably mounted to the frame 22 by a pivot pin 114, includes a generally cylindrical lower portion 116, over which the drive belt 30 is entrained, and a generally cylindrical, upper portion 118, over which the second tape 28 is entrained. Peripheries of both portions 116 and 118 are slightly crowned to cause centering of the drive belt 30 and tape 28. Necessary drive belt tensioning, as described below, is provided by forming the outer diameter of the upper portion 118 to be slightly less than that of the lower portion 116.

External driving of the drive roller 102 is enabled by radially projecting, top, intermediate and bottom flanges, 120, 122 and 124, respectively, the intermediate flange also serving to separate the upper and lower portions 116 and 118. The drive roller 102, formed so that the lower and upper portions 116 and 118 rotate about the pivot pin 114 in unison, is constrained to the pin 114 by a snap ring 126.

Both the rear idlers 104 and 106 are identical, each resembling the drive roller 102. Accordingly, the idler 104 (FIG. 5) comprises a generally cylindrical, lower portion 128 over which the drive belt 30 is entrained and a generally cylindrical upper, portion 130, over which the second tape 28 is entrained. A narrow annular flange 132 axially separates the guide portions 128 and 130 and a large diameter, radially projecting bottom flange 134 enables external driving of the idler 104. The idler 104 is rotatably mounted on a pivot pin 136 and is retained thereon by a snap ring 138.

Similarly, the idler 106 (FIG. 1) is formed having a lower drive belt guide portion 140, an upper tape guide portion 142 and an externally engageable drive flange 144. The idler 106 is rotatably mounted on a pivot pin 146.

Outer surfaces of the lower drive belt guide portions 128 and 140 and the upper tape guide portions 130 and 142 of the idlers 104 and 106 are the same diameter, and are slightly crowned to cause centering the drive belt 30 and the second tape 28.

External drive access to the drive roller 102 is provided by arcuate recesses 148 and 150 formed, respectively, in the frame forward edge 70 and in the cover forward edge 74. For similar external drive access to the idler flanges 134 and 144, recesses 152 and 154 are formed in the frame side edges 82 and 84, respectively. Corresponding idler drive access openings 156 and 158 are formed in cover side edges 160 and 162, respectively (FIG. 1).

Upon installation at the cartridge 20 in a compatible tape machine 164, the second tape 28 and the first tape 26 (through the drive belt 30) are driven, through the drive roller 102, by an external driver 166 connected to a motor 168 (FIG. 6), both tapes being driven past a tape head 170 which engages the tapes through the cover opening 72. Alternatively, the tapes 26 and 28 may be driven through the idlers 104 and 106 by corresponding external drivers (not shown).

To enable proper transferring of the first tape 26 between the hubs 36 and 38 and thus proper, tensioned transporting of the tape loop 62 across the recess 68 and the opening 72, a tension difference must be caused between the drive belt portions 110 and 112 engaging, respectively, the tape peripheral surfaces 58 and 60 of the tape wound hubs 36 and 38. Cartridge construction as described permits bilateral tape transport, therefore, tension in that drive belt portion 110 or 112 which engages the tape periphery on the hub to which the tape 26 is being transferred must be greater than tension in the other drive belt portion engaging the other tape periphery.

Some other types of peripheral drive tape apparatus cause differential drive belt tensioning by suitably retarding or slowing rotational speed of drive belyt idlers which correspond to the first and second idlers 104 and 106. This may be accomplished either by driving the idlers slightly slower than the drive roller is driven, or by incorporating frictional drag elements in the idlers. Disadvantages are that differential idler driving ordinarily requires relatively expensive, synchronized external drive apparatus, and incorporating drag elements in the idler mounting introduces frictional losses and is unsuited for high drive velocities because of frictional wear.

High performance peripheral drive tape apparatus, such as is the cartridge 20, in contrast, may tension the drive belt by a separate tensioning belt entrained in common with the drive belt over a drive roller and at least one idler, both belts being driven in unison whenever either is driven. By using different diameters on drive belt and tensioning belt portions of the drive roller and/or one of the idlers, the tensioning belt causes, in operation, some portions of the drive belt to speed up and others to slow down, causing higher tension in the speeded up portions.

In the cartridge 20, it is the second record-tape 28 that functions as the drive belt tensioning belt, as more particularly described below. In addition, since both the drive belt 30 and the second tape 28 are entrained in common over the drive roller 102 and the idlers 104 and 106, the roller, idlers and the drive belt comrpise means mechanically interconnecting the tapes 26 and 28 so that both tapes are always transported simultaneously whenever one is. Because of interconnection between the tapes 26 and 28 only a single external driver is required to drive both tapes.

In addition to being entrained, respectively, over the upper portions 118, 130 and 142, of the drive roller 102 and idlers 104 and 106, as well as over upper portions 88 and 92 of the guides 90 and 92, the second tape 28 is entrained around other tape guide members which enable transport of the second tape. For example, four rearward, second tape guide members 182, 184, 186 and 188 (FIGS. 1, 2 and 6) are pivotally mounted to the frame 22 near the rear edge 108, at equal spacing between the idlers 104 and 106; four forward second tape guide members, 190, 192, 194 and 196 are pivotally mounted to the frame 22 near the forward edge 70. The guide members 190 and 192 are spaced between the first guide 64 and the drive roller 102 and the guide members 194 and 196 are spaced between the drive roller and the second idler 106. Arrangement of the guide members 182-196 may be symmetrical about a transverse cartridge center line through the drive roller 102, as shown.

Each of the eight guide members 182-196 includes a crowned roller rotatably mounted on an associated pivot pin. As a illustration, the guide member 182 comprises a rotatable roller 198 mounted on a pivot pin 200 (FIG. 1).

Axes of the eight guide members 182-196, idlers 104 and 106, guides 64 and 66, drive roller 102 and hubs 36 and 38 are parallel and orthogonal to the frame 22. Coincident planes through longitudinal center lines of the first tape 26 and the drive belt 30 are parallel to the plane of the frame 22. As shown in FIG. 1, a plane through the longitudinal center line of the second tape 28 is upwardly displaced from that of the first tape. Consequently, the two tapes 26 and 28 pass across the cartridge opening 72 at different levels.

Figure 6:
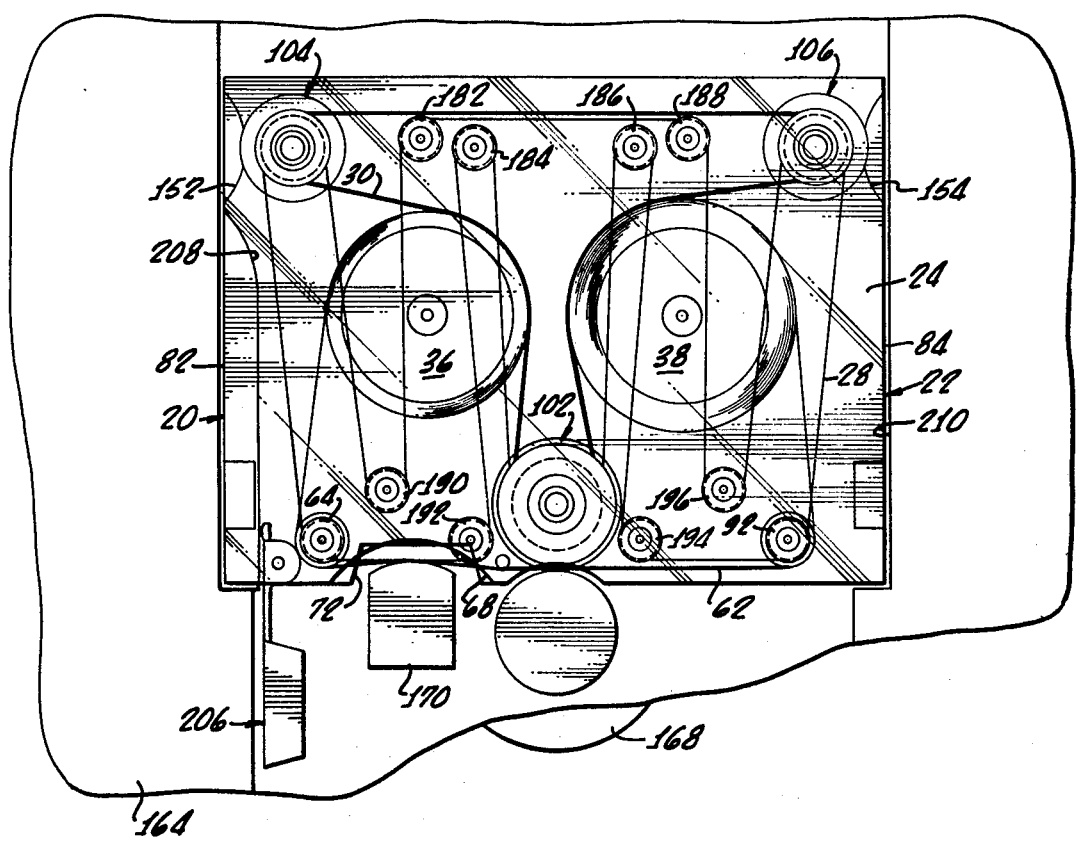
FIG. 6 is a plan view, showing the dual tape cartridge installed in a tape machine.

FIGS. 1, 2 and 6 show how the second tape 28 is looped in a festooned second tape path, around the guide members 182-196, guides 64 and 66, idlers 104 and 106 and drive roller 102 to provide an extended recording length very much greater than the length necessary to tension the drive belt 30. The second tape path is also substantially greater than the cartridge periphery.

Such routing of the second tape 28, starting at the first idler 104, is forwardly around the first guide 64, right around the second forward guide member 192, rearwardly around the second rearward guide 184, back forwardly around the drive roller 102, rearwardly about the third rearward guide member 186, forwardly around the third forward guide member 186, then right around the second guide 66, back rearwardly around the second idler 106, forwardly again around the fourth guide member 196, rearwardly about the fourth rearward guide member 188, then left around the first rearward guide member 182, back forwardly about the first forward guide member 190 and finally back rearwardly about the first idler. Mounting of the second tape 28 in this particular manner very importantly also causes the second tape 28 to always move, during tape transport, across the opening 72 in a record/playback direction opposite to that of the first tape, and also across the opening in opposite physical directions.

The cartridge 20 may have the same outline dimensions and features, other than as described, as type DC 100A cartridges available from the 3M Company of St. Paul, Minn., and for which registration has been sought from the American National Standards Institute. For example, a conventional protective portion 208, hinged to the frame 22 outboard of the first guide 64, is spring loaded to normally cover the opening 72, thereby protecting the tapes 26 and 28 in this region when the cartridge is not in use. When the cartridge 20 is installed in the associated apparatus 164 (FIG. 6), the portion 206 engages a ramp projection 208 in a cartridge receiving recess 210 and is automatically pivoted away from the opening 72, to permit tape engagement by the tape head 170.

Facilitated insertion and removal of the tape cartridge 20 from the machine 164 is provided by forming upper rear portions 212 and 214 of the cover 24, in the region of the openings 156 and 158, with grooved finger grip surfaces. Rectangular indexing cutouts 216 and 218 (FIG. 2) are formed in the frame side edges 82 and 84, near the guides 64 and 66. The cover 24 is formed of strong rigid plastic, preferably with transparent portions of enabling visual observation of cartridge condition.

Referring to FIG. 6, the cartridge 20 is installed in cartridge receiving portions of the apparatus 164, with the drive member 102 in driven engagement with the drive member 166. The drive member 166 is rotated in a clockwise direction (Arrow A) by the motor 168, to drive the drive roller 102 counterclockwise (Arrow B) and move the drive belt 30 in a generally counterclockwise direction (Arrow C). This drive belt movement causes the idlers 104 and 106 to rotate counterclockwise (Arrows D and E, respectively).

Frictional engagement between the moving drive belt portions 110 and 112 and the respective hub tape peripheries 58 and 60 causes clockwise rotation of the hubs 36 and 38 (Arrows F and G). As a result, the tape loop 62 is transported generally clockwise, (Arrow H), in reverse record/playback direction, as the first tape 26 is transferred from the second hub 38 to the first hub 36.

Because of being entrained over the drive roller 102, roller rotation causes simultaneous transport movement of the second tape 28, as described above. The second tape 28 and the drive belt 30 are also both entrained over the idlers 104 and 106. However, the slightly smaller outside diameter of the drive member upper portion 118 over which the second tape 28 passes, and assuming no tape or belt slipping, causes the second tape to be driven at a slightly slower speed than is the drive belt 30. But because outer diameters of the upper and lower portions 130, 142 and 128, 140, respectively, of the idlers 104 and 106 are the same, the drive belt 30 and the second tape 28, each traveling at a different velocity, try to turn the idlers at different rotational speeds.

If only the drive belt 30 passed over the idler 104 and 106, the idlers would be rotated at a specific, corresponding angular velocity. But because the slightly slower moving second tape 28 is also entrained over the idlers 104 and 106, this angular velocity is slowed and the resulting angular velocity falls between that which would be caused by either the drive belt 30 or the second tape 28 acting independently.

As a result of the idlers 104 and 106 being rotated at slightly lower angular velocity than would otherwise be caused by the drive belt 30, the drive belt must slow down as it passes over the idlers. Assuming the drive belt leaves the drive roller 102 with a linear velocity, V, it is picked up by the idlers 106 and 104 (in that sequence) at a lower velocity, $V - \Delta V$. This causes the drive belt portion 112 to travel slower, as such portion engages the second hub tape periphery 60, after leaving the drive roller 102 and before reaching the second idler 106, than does the portion 110 that engages the first hub tape periphery 58 after leaving the first idler 104 and before reaching the drive roller.

This differential drive belt velocity, with the portion 110 traveling faster than the portion 112, causes tension in the portion 110 to be greater than in the portion 112, as is necessary for maintaining the tape loop 62 taut as the loop crosses the tape access opening 72. The amount of tension difference between the drive belt portions 110 and 112 can be changed by selecting different diameters of the drive roller guide portions 116 and 118. For example, as the diameter of the upper second tape guide portion 118 is decreased, keeping the diameter of the lower drive belt guide portion 116 fixed, the difference in tension between the drive belt portions 110 and 112 is increased.

By application of similar analysis, when the drive roller 102 is rotated in a clockwise direction, thereby causing the first tape 26 to be transported in the opposite direction (normal record/playback direction) from the first hub 36 to the second hub 38, tension in the drive belt portion 112 engaging the tape periphery 60 is seen to be greater than that in the drive belt portion 110 engaging the tape periphery 58.

The described arrangement of the tape guides 182-196 causes the second tape 28 to be transported along a closed meandering path (Arrow J, FIGS. 2 and 6). It is emphasized that the second tape 28 is guided across the tape head 170 above the first tape 26 always in a record/playback direction opposite to that of the first tape, regardless of actual transport direction. For example, with the shown counterclockwise rotation of the drive roller 102, the second tape 28 passes across the tape head 170 from left to right in a normal record/playback direction; whereas, the first tape 26, in the form of the tape loop 62, travels across the tape head from right to left in a reverse record/playback direction. It is emphasized that regardless of what regions may be selected on the first and second tape paths for examination, the two tapes 26 and 28 are always transported in opposite record/playback directions, assuming both tapes are recorded in a normal record direction.

This counter transport of the tapes 26 and 28 past the tape head 170, as an example, enables minimized cueing time in associated telephone answering apparatus, as described below, enabling the apparatus to perform comparably with more expensive machines using two separate tapes.

By way of a specific illustration, with no limitations intended or implied, the cartridge 20, as particularly configured for use in the below described automatic telephone answering apparatus, may be formed as follows. The cartridge outline dimensions, which conform with those of the DC 100A cartridge, are approximately 3.2 inches by 2.4 inches by $\frac{1}{2}$ inch high. The first tape 26 comprises 100 feet of 0.75 mil thick by 150 mil wide Mylar magnetic recording tape. Diameters of the first tape hubs 36 and 38 are 0.718 inches. The drive belt 36 comprises 1.5 mil thick by 100 mil wide Mylar, and is $1\frac{1}{8}$ times as stiff as the first tape 26, stiffness as used herein being defined as the cross-sectional area (A) times Young's Modulus of Elasticity (E) for the material. Selection of the drive belt length is such to cause 1 to 2 ounces of tension in the first tape 26 during operation. The drive belt is pretensioned to about 10 ounces, an amount sufficient, for example, to maintain frictional drive of the first tape 26 for all drive conditions and to assure proper tracking over the various guides.

Constructed of 1.25 mil thick by 50 mil wide Mylar magnetic recording tape, the second tape 28 is half as stiff as the first tape 26 and is about 24 inches long, enabling 24 seconds of recording at 1 inch per second. Such a recording speed is compatible with typical telephone transmission bandwidths for voice, touch tone, facimile, etc.

The diameter of the upper drive roller portion 118, over which the second tape 28 passes, is 0.435 inches; whereas, the diameter of the corresponding lower, roller belt portion 116 is 0.440 inches. The resulting 0.005 inch diameter difference enables the second tape 28 to provide differential tensioning in the drive belt portions 110 and 112, as above described, of about $1\frac{1}{2}$–$2\frac{3}{8}$ ounces.

Diameters of upper portions 130 and 142 and lower portions 128 and 140, respectively, of the idlers 104 and 106 are 0.336 inches. Diameters of upper portions 88 and 92 of the guides 64 and 66 are 0.200 inches and diameters of the associated lower portions 86 and 90 are 0.238 inches.

X, Y coordinates (in inches) of the hubs 36 and 38, idlers 104 and 106, drive roller 102 and guides 64 and 66, relative to a (0.0) position at the center of the frame front edge 70, are as follows (the X axis being towards side edges 82 and 84 and the Y axis being orthogonal thereto):

| | Ref. No. | X | Y |
|---|---|---|---|
| Hub | 36 | −.616 | 1.284 |
| | 38 | +.616 | |
| Idler | 104 | −1.280 | 2.062 |
| | 106 | +1.280 | |
| Drive Roller | 102 | 0 | .375 |
| Guide | 64 | −1.123 | .207 |
| | 66 | +1.273 | .182 |

Positioning of the hubs 36 and 38, idlers 104 and 105, drive member 102 and guides 66 and 68, in this manner — assuming a 2:1 ratio between diameters of full tape wound and empty hubs — has been determined, in accordance with the disclosure of my copending patent application, entitled "TAPE TRANSPORT SYSTEM WITH PERIPHERAL BELT DRIVE", Ser. No. 758,781 filed on Jan 12, 1977 and abandoned in favor of continuing application Ser. No. 824,166 filed on Aug. 12, 1977, to provide a $|\Delta L/L|$ for the drive belt 30 of about 50–60 parts per million. $=\Delta L/L=$ is herein defined as the absolute value of the ratio of the change in length of the drive belt 30, as the first tape 26 is transferred between the hubs 36 and 38, to initial drive belt length, and is a measure of the amount of stretch the drive belt undergoes during driving of the first tape.

In considering use of the dual tape cartridge 20 in an automatic telephone answering apparatus, it should be emphasized that an important design objective for such apparatus is minimizing time delays not only for efficient apparatus and telephone utilization but, more importantly, for caller convenience and service. The most undesirable delay is ordinarily the cueing delay between the end of an announcement to a caller and the time the message tape is properly positioned and the caller is signalled to start his message. If cueing delays are excessive, a caller is inconvenienced and may hang up without leaving a message. Not only may calls be lost, but excessive cueing delays reflect adversely on persons and businesses trying to maintain a reputation for efficiency and promptness. Minimal cueing delay is, as a result, considered characteristic of high quality answering apparatus.

In cooperation with the automatic telephone answering apparatus 164, simultaneous but counter record/playback travel of the two tapes 26 and 28 past the tape head 170 is extremely advantageous. In the manner explained below, such sychronous counter tape transport enables cueing times comparable to those of more complicated and more expensive answering apparatus using two separate and separately driven tapes.

With the cartridge 20 installed in cartridge receiving portions 208 of the telephone answering apparatus 164, the second tape 28 functions as an announcement of "A" tape upon which an announcement for callers is recorded. It is to be appreciated that the terms "announcement" and "caller" as used herein are defined broadly and may include, for example, digitally encoded "announcement" instructions to a computer "caller". Messages left by callers are recorded on the first tape 26, which accordingly functions as a message or "B" tape. Accordingly, for purposes of the following description, the first and second tapes 26 and 28 will normally be referred to, respectively, as the "A" and "B" tapes.

Figure 7:
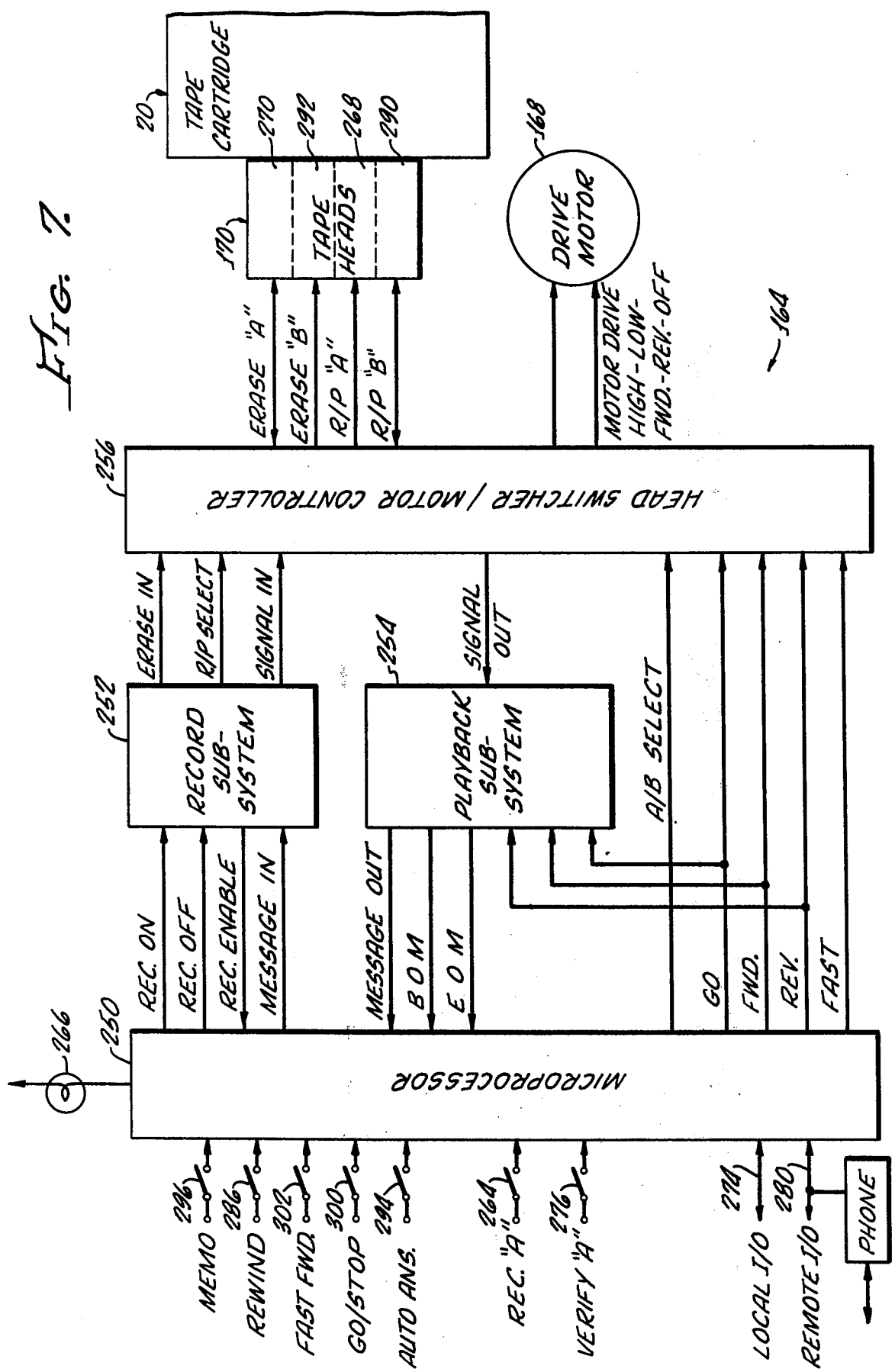
FIG. 7 is a block diagram, showing operational features of an automatic telephone answering apparatus which uses the dual cartridge.

Electronic portions of the exemplary telephone answering apparatus 164, depicted diagramatically in FIG. 7, include a microprocessor 250, a record subsystem 252, a playback subsystem 254 and a head switcher/motor controller 256, as well as the previously mentioned tape head 170 and drive motor 168, the latter being connected to the drive member 166. All of these portions are connected in operative relationship, in the manner shown in FIG. 7.

By way of brief functional description, the microprocessor 250 processes readily transmittable high/low input commands or signals into output commands of the type and levels necessary for controlling and operating the related portions of the apparatus. Although, when the below defined functions are known, configuration of the microprocessor 250 is readily ascertained by those skilled in the art, an exemplary truth table defining the microprocessor is shown in the FIG. 12.

Intended input messages to the apparatus 164 are audio, touch tone or any other data that can be telephone transmitted; accordingly, the record subsystem 252 provides direct record with bias to the tape head 170. In other types of apparatus adapted for receiving digital messages without telephone transmission, use of NRZ, phase encoding or other well known digital recording systems would be used.

As more particularly described below, in conjunction with the block diagram of FIG. 9, the record subsystem 252 includes provision for recording a pilot or system control tone with the announcement on the "A" tape 28 and messages on the "B" tape 26, the pilot tone which leads, accompanies and trails the announcement and messages, enables detection of beginning and ends thereof. The subsystem 252 also provides for remote on/off switching of bias, erase and signal drive currents.

The playback subsystem 252, depicted schematically in FIG. 10 and more fully described below, processes outputs from the "A" and "B" tapes 28 and 26, including the pilot tones, so that ends of message (and announcements) referred to as EOM, and their beginnings, referred to as BOM, can be derived for automatic cueing.

As illustrated schematically in FIG. 8 and described below, the head switcher/motor controller 256 provides for switching between "A" and "B" tape head portions of the tape head 170 and for controlling speed and rotational direction of the drive motor 168. First and second switching portions 258 and 260 of the head switcher/motor controller 256 coordinate motor rotational direction with the tapes being used.

Functional and operational features of the answering apparatus 164, including the portions 250, 252, 254 and 256 thereof, are best understood by considering a typical operating sequence of the apparatus.

Figure 8:
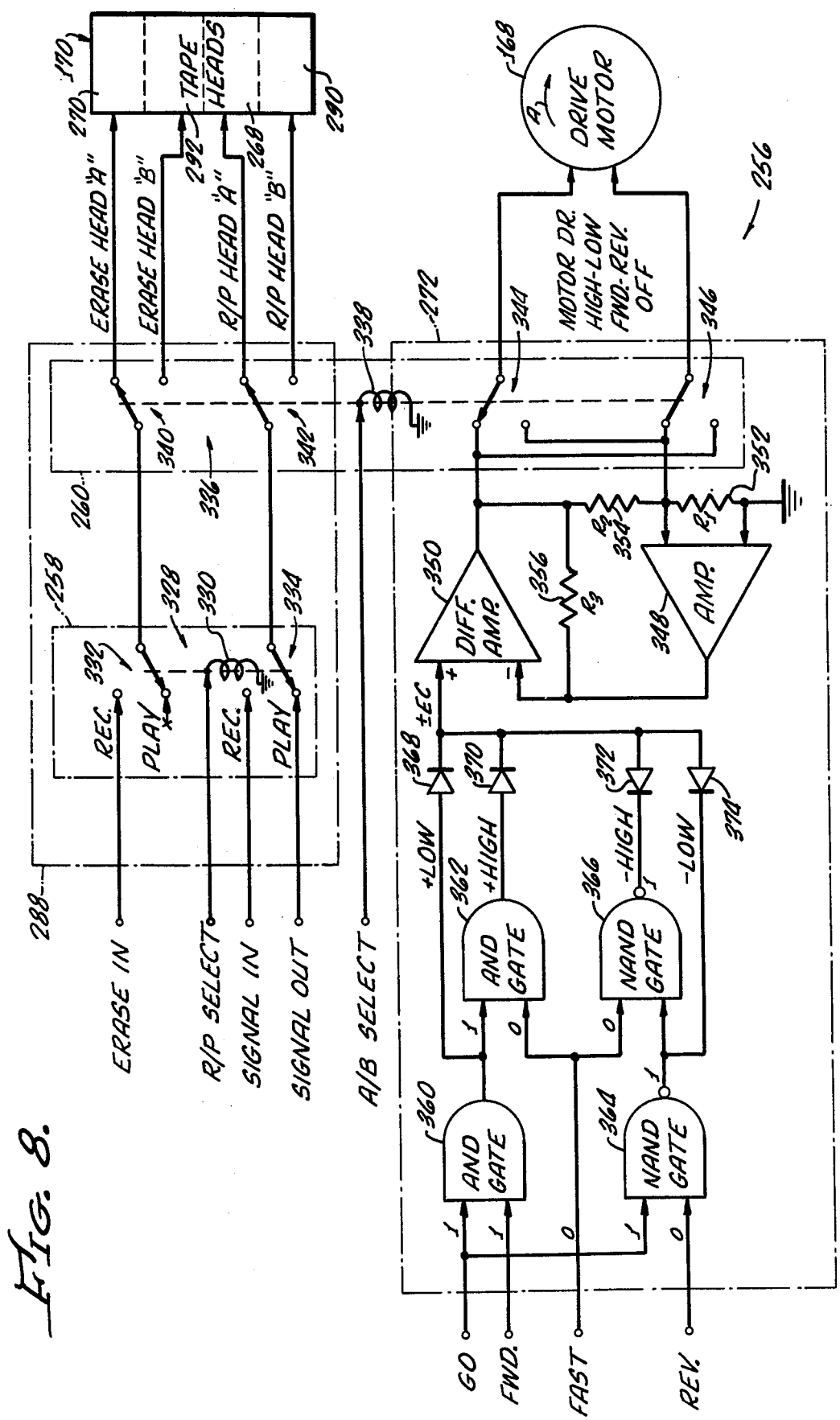
FIG. 8 is a schematic drawing of a head switcher/motor controller portion of the telephone answering apparatus.

Referring principally to FIGS. 7 and 8, in preparing the apparatus 164 for use, an announcement is recorded onto the "A" tape 28. To do so, a "RECORD A" key 264, connected to an input of the microprocessor 250, is depressed and a record light 266, also connected to the microprocessor, is watched. In response to depressing of the key 264, "A" tape record/play (R/P) and erase portions 268 and 270, respectively, of the tape head 170 are switched to the record subsection 252. The microprocessor 250 sends GO/REV. (reverse) commands to a motor controller portion 272 of the head switcher/motor controller 256 (FIG. 8) to cause the drive motor 168 to rotate in a slow counterclockwise direction, thereby driving the "A" tape 28 in reverse R/P direction one complete revolution while the "A" erase head portion 270 is erasing any previously recorded announcements.

After lapse of sufficient time to ensure complete erasing of the entire "A" tape 28 — about 24 seconds at normal R/P speeds — the microprocessor 250 switches signals to the motor controller portion 272 to GO/FWD. (forward), causing the drive motor 168 to reverse to slow clockwise rotation and the record subsystem 252 to turn on. In response thereto, a RECORD ENABLE signal is sent by the record subsection 252 to the microprocessor 250 to turn on the record light 266, thereby indicating the "A" tape 28 is ready for recording.

An announcement is recorded onto the "A" tape 28, for example, by talking into a microphone (not shown), the output of which is fed externally into a LOCAL I/O (input/output) jack 274 at the microprocessor 250, through an internal microphone (also not shown) internally connected to the LOCAL I/O jack, or directly from the telephone transmission line (also not shown). The announcement is recorded onto the "A" tape 28 with pilot tone leader, announcement plus pilot tone, pilot tone trailer and inter-record erased gap, as explained below in the description of the record subsection 252. It should be understood that if the announcement is encoded instructions from a computer, then the record enable indication may be a gating signal instead of a light.

Upon completion of recording the announcement on the "A" tape 28, the user can check the announcement by depressing a VERIFY "A" key 276 connected to the microprocessor 250. In response, the microprocessor 250 causes the "A" tape head portions 268 and 270 to be switched to the playback subsection 254 and the drive motor sequence for record to be repeated, thereby rewinding and playing back the announcement from the "A" tape.

To ready the apparatus 164 for answering a telephone 278, connected to the microprocessor 250 at a REMOTE I/O line 280, a microprocessor connected REWIND key 286 is depressed. This causes a head switcher portion 288 of the head switcher/motor controller 256 to switch to "B" tape head record/play portion 290 of the tape head 170, thereby also reversing polarity of drive motor contacts. The microprocessor 250 then sends GO/FAST/REV. commands to the motor controller portion 272, causing the drive motor 168 to rotate clockwise until the "B" tape 26 is wound back to the beginning (BOT). It should be noted that the term "contacts" as used herein includes solid state switches as well as relays.

An AUTO ANS. (answer) key 294, connected to the microprocessor 250, is then momentarily depressed by the user. In response, the microprocessor 250 causes the head switcher portion 288 to switch the "A" head portions 268 and 270 back to the playback subsystem 254. The drive motor 168 is rotated counterclockwise (GO/REV.) until the "A" tape 38 announcement beginning of message (BOM) is detected, at which point all drive motor commands are cancelled and the apparatus 164 is "parked" ready for a first telephone call.

Then, in response to ringing of the telephone 278, the microprocessor 250 commands the drive motor 168 to rotate clockwise slow (GO/FWD.) and the announcement from the "A" tape 28 is played over a telephone line 296 to the caller until the end of announcement (EOM) signal is detected by the playback subsystem 254. At that point, the microprocessor 250 causes switching to the "B" tape head portion 290 and generates GO/FAST/REV. commands to the motor controller portion 272 to rewind the "B" tape 26 to its beginning (BOT). Then, the microprocessor 250 switches the "B" tape head portions 290 and 292 to record, reverses the drive motor 168 to slow, counterclockwise rotation (GO/FWD.) and a pilot tone leader is recorded on the "B" tape 26. A RECORD ENABLE command from the record subsystem 252 to the microprocessor 250 then generates a "beep" tone signalling the caller to give his message.

For about seven seconds after the caller finishes his message and stops talking, a pilot tone trailer is automatically recorded on the "B" tape 26. The pilot tone then stops and a six or seven second erased, inter-record gap is generated by the record subsection 252, with the erasing of any "old" messages present.

Assuming the "A" tape 28, at normal playback speed, is 24 seconds long, a minimum of 17 seconds after the inter-record gap is completed, the playback subsystem 254 starts searching for the BOM indication on the "A" tape 28. For this purpose, the "A" tape head portion 268 is switched in and the drive motor 168 continues advancing the "B" tape at slow R/P speed thereby causing searching of the "A" tape in reverse R/P direction.

When the beginning of the announcement (BOM) on the "A" tape 28 is found, all motor controls are again cancelled and the apparatus is "parked" ready for the next call.

Upon receiving a second call, the above described sequence is repeated, with the difference that the "B" tape 26 cues on the pilot tone trailer of the first message (EOM) instead of on the beginning of the tape (BOT).

Should a user wish to add a local message, he depresses a MEMO key 296 connected to the microprocessor 250 while the apparatus is still in the AUTO ANS. mode. In response, the microprocessor 250 skips the described announcement sequence and cues directly to the pilot tone trailer of the last recorded message (EOM). This involves switching to the "B" tape head portion 290 to play, and commanding the motor controller portion 272 GO/FAST/REV. to search for the EOM, then switching the "B" tape heads to record and commanding the motor controller portion GO/FWD. Messages can then be recorded onto the "B" tape through the above mentioned external or internal microphones and so forth.

To playback messages, a GO/STOP key 300 connected to the microprocessor 250 is depressed, taking the apparatus out of automatic control by the microprocessor. The user then depresses the REWIND key 286 until the beginning of the tape (BOT) is reached, whereupon the messages are played back. The "B" tape 26 may be advanced by depressing a FAST/FWD. (forward) key 302 connected to the microprocessor 250. When the user has finished listening to the messages, depressing the GO/STOP key 300 will turn the machine off. Alternatively, a user may remove the cartridge 20 from the apparatus 164 and playback the messages on another tape apparatus (not shown). It should be noted that all keyboard switch commands described above may be duplicated by remotely controlled solid state switches, or the like, (not shown) by techniques well known to those skilled in the art, in which event the operator may be at a remote location.

Major advantages of the "A" and "B" tapes 28 and 26 being always transported across the tape head 170 in opposite R/P directions is apparent from greater examination of operational aspects of the apparatus 164, in conjunction with FIG. 11.

As depicted in FIG. 11 (a), during recording of a message on the "B" tape 26, this tape is advanced in a slow R/P direction (right to left, in direction of Arrow A). Simultaneously, the "A" tape 28 is being circulated in a reverse R/P direction (left to right, in the direction of Arrow B). Assuming the caller has just completed a message 306 (depicted in FIG. 11 by a wavy line on the "B" tape 26) the apparatus 164 continues slow R/P advancement of the "B" tape 26 (and hence slow reverse R/P recirculation of the "A" tape 28) for seven more seconds. During this time, a pilot tone trailer 308 (FIG. 11 (b)) is added to the recorded message. Then for an additional seven seconds any old messages 310 are erased, thereby forming an inter-record gap 312.

Thus, as described above, 17 seconds later the apparatus 164 starts searching the "A" tape 28 for the beginning (BOM) 314 of an announcement 316 (represented in FIG. 11 by a wavy line) by looking for a pilot tone leader 320 which just precedes the announcement. Because this search, which is conducted at slow speed in the R/P direction for the "B" tape (reverse R/P for the "A" tape) an end (EOM) 322 of the just recorded message 306 continues to advance away from the tape head 170.

Thus, as seen in FIG. 11(c), when the announcement BOM 314 just reaches the tape head 170, the pilot tone trailer 308 of the last message 306 is at least a full announcement length (24 seconds of normal speed playing time) in advance of the head, which explains the 17 second delay before starting the search. The pilot tone trailer 308 may be in advance of the head 170 as much as 48 seconds. However, because when search for the announcement BOM 314 is started, the "A" tape 28 is randomly positioned relative to the head 170, the search time averages only about 12 seconds; however, this particular search time is generally not important since it occurs between calls when the apparatus is "off-line". Consequently on the other hand, the message pilot tone trailer 308 is on the average about 36 seconds, at normal R/P speed, from the head 170 when the drive motor 168 stops awaiting a call.

However, as the announcement is subsequently played to a next caller, by driving the "A" tape 28 in a normal R/P direction (left to right, Arrow C), the "B" tape is simultaneously driven in a reverse R/P direction, being therefore rewound from right to left (Arrow D) to move the message EOM 322 back towards the head 170 (FIG. 11 (d)). As a result, when an announcement end of message (EOM) 324 (FIG. 11 (e)) on the "A" tape 28 is reached, the message pilot tone trailer 308 is back to within no more than about 24 seconds, and usually less than 12 seconds of normal playing time from the tape head 170. At this instant, however, the motor 168 is shifted to high speed to drive "B" tape at high speed in reverse R/P direction (Arrow D) as the "B" tape R/P head portions 290 searches for the pilot tone trailer 308. At high speed, the pilot tone trailer reaches the head 170 in only about 1-2 seconds. The "B" tape is then advanced at normal playback/record speed for an additional 1-2 seconds to make certain that the previous message is not invaded by a new message. This total 3-4 seconds represents the cueing time delay — the delay between when the announcement ends and when the "B" tape 26 is ready to record another message.

Counter R/P direction travel of the "A" and "B" tapes 28 and 26 past the tape head 170 enables this very short cueing time, not only because, at the end of the announcement, the message EOM 322 ends up relatively close to the tape head 170, but also because the deceleration distance reduces the intermessage gap (rather than increasing it as would be the case for EOM search from within the message); that is, such EOM search always ends up ahead of the tape head. This permits always searching for the last message EOM 322 — actually the last pilot tone trailer 308 — from outside the message and across the erased portion 312 or inter-record gap. As a result, the pilot tone trailer 308 is easy to detect, even at high tape speeds. Accordingly, the EOM search can be made at all speeds, even during acceleration. This would not be possible if the search were made in an opposite direction through the message itself.

This combination of short "B" tape search distance and fast search speed, both enabled by counter R/P travel of the "A" and "B" tapes past the tape head 170, results in very short cueing times which are comparable to those heretofor only obtainable with more costly, separate two tape telephone answering apparatus.

Through this analysis, it can be seen that if both the "A" and "B" tapes 28 and 26, for the application described, were instead transported in a common, rather than in an opposite, R/P direction past the tape head 170, the cueing times would be substantially greater.

Although the head selector/motor controller 256 can be implemented in a number of generally conventional ways, one illustrative manner is depicted in FIG. 8. As shown, the head switcher/motor controller 256 is diagramatically separated into the head switcher portion 288 and the motor controller portion 272.

The first switching portion 258, which forms a part of the head switcher portion 288, comprises a first conventional latching relay 328, a coil 330 of which is controlled by the R/P SELECT line. Energizing the relay 328 switches both a first set of erase contacts 332 and a second set of signal contacts 334 between PLAY and RECORD. "PLAY" contact portions of the erase contacts 332 are not needed and are not externally connected.

Coordinated selection between "A" and "B" tapes 28 and 26 and tape head positions 268, 270, 290 and 292, as well as rotational direction of the drive motor 168, is provided by the switching portion 260, which forms part of both the head switching portion 288 and the motor controller portion 272. The switching portion 260 comprises a second conventional latching relay 236, a coil 338 of which is energized by the A/B SELECT line. Energizing the second relay 336 switches a first set of erase contacts 340 between "A" and "B" erase head portions 270 and 292, respectively. A second set of R/P contacts 342 switches between "A" and "B" R/P head portions 268 and 290 respectively. Third and fourth contacts sets 344 and 346 reverse polarity of the drive motor 168.

The motor controller portion 256, in addition to including portions of the second switching portion 260, controls rotational speeds of the drive motor 168 and also direction of motor rotation in response to GO, FWD. (forward) FAST and REV. (reverse) commands from the microprocessor 250 (FIG. 7).

As above described searching the "A" tape 28 for the announcement BOM 314 is with the "A" tape R/P head portion 268, but with the tape traveling in a reverse R/P direction. Therefore the switching portion 260, which switches between "A" and "B" tape head portions 268, 270 and 290, 292, can also, in response to commands through the A/B SELECT line, control direction of rotation of the drive motor 168. The actual direction of rotation can be changed, from clockwise to counterclockwise, even though the rest of the motor controller portion 372 is, for example, still operating on a FWD. command.

The motor controller portion 272, exclusive of the switching portion 260, includes an amplifier 348, a differential amplifier 350, a voltage divider comprising first, second and third resistors 352, 254 and 356, first and second AND gates 350 and 262, first and second NAND gates 364 and 366 and first through fourth diodes 364, 370, 372 and 374, respectively. These elements are electrically connected as shown in FIG. 8.

The AND gates 360 and 362, NAND gates 364 and 366 and four diodes 368 - 374 provide, in a conventional manner, a reference control voltage, $\pm E_C$, at a point 376. For example, with GO/FWD. commands from the microprocessor 250 to the controller portion 272, the AND gate 360 is turned on, thereby supplying (from a voltage source, not shown) a positive low voltage to the point 376 to drive the motor 168 at a slow speed.

Back EMF of the motor 168, detected in the bridge comprising the three resistors 352, 354 and 356, is fed to the differential amplifier 356. Upon comparing the back EMF to the reference control voltage ($\pm E_C$), the differential amplifier 356 generates a drive voltage to the motor 168 to cause the speed thereof to arrive at a point where the back EMF matches the plus or minus $E_c$ applies.

The amplifier 348 is a conventional voltage amplifier, the gain of which may be determined as follows:
Let $R_A$ = internal resistance of motor 168
$I_M$ = current of the motor 168
EMF = back EMF of the motor 168
Set $R_1 = R_A/x$ (x being any selected value)
Then $V$ = total voltage applied to the motor 168

$$= I_M(R_A + R_A/x) + EMF$$

$$= I_M R_A (1 + 1/x) + EMF$$

For voltage at the output of the amplifier 348 to equal the motor EMF, the voltage drop across the resistor 356 ($R_3$) should be equal to the sum of the voltage drops across $R_A$ and the resistor 352 ($R_1$), which would require an amplifier gain of:

$$A = \frac{I_M R_A (1 + 1/x)}{I_M R_A/x}$$

$$= x + 1$$

Values of the resistors 356 and 354 ($R_3$) and ($R_2$) are selected to give this gain for the amplifier 348 and the motor 168 employed.

The differential amplifier 350 is a conventional bidirectional differential amplifier of sufficient drive capacity to drive the motor 168 over the range of speeds required by the apparatus 164.

Figure 9:
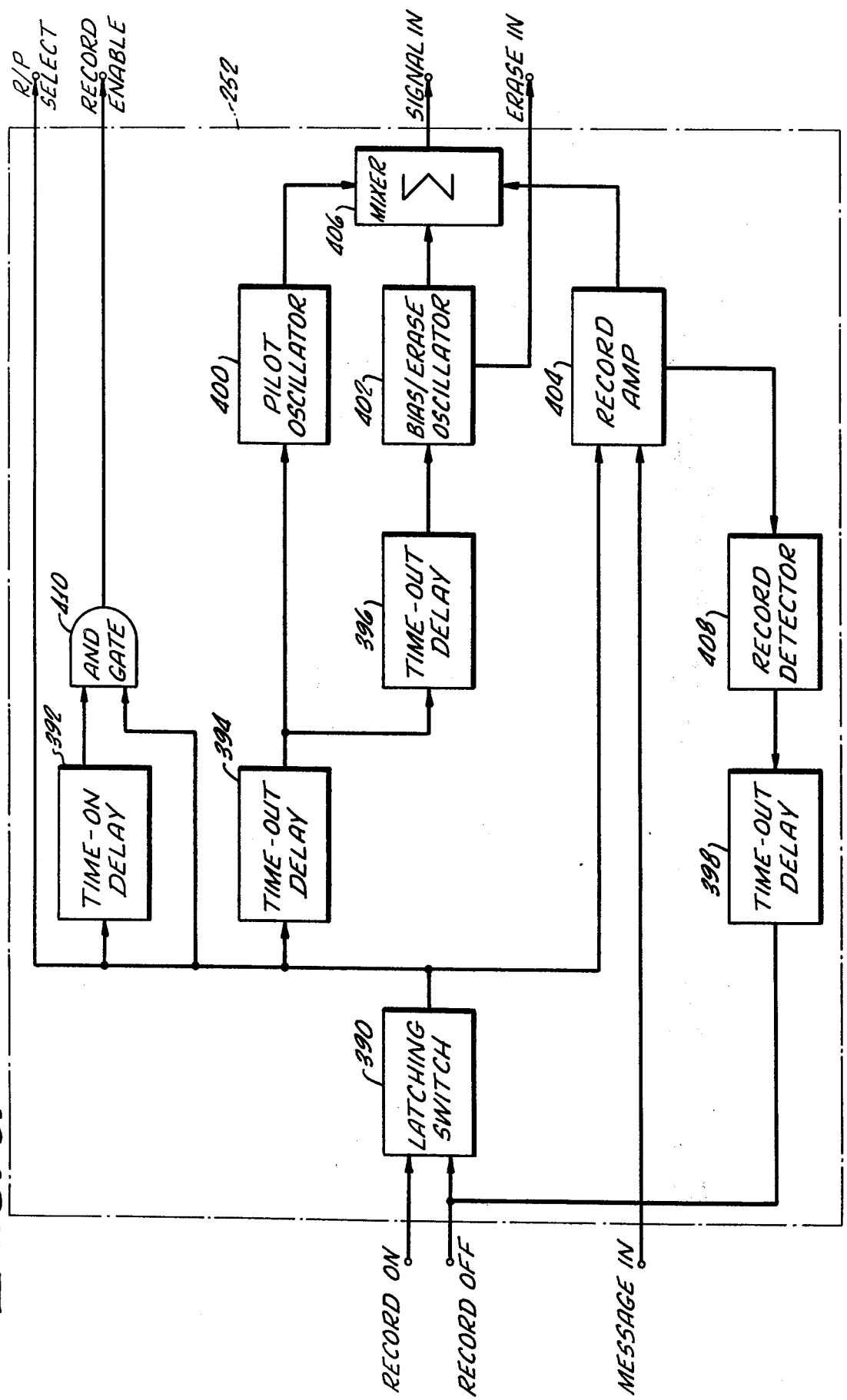
FIG. 9 is a block diagram of a record subsystem of the answering apparatus.

As depicted in block diagram form in FIG. 9, and taken in conjunction with FIG. 7, the record subsystem 252 includes generally a latching switch 390, a "time on" delay 392, first, second and third "time out" delays 394, 396 and 398, respectively, a pilot oscillator 400, a bias/erase oscillator 402, a record amplifier 404, a mixer 406, a record detector 408 and an AND gate 410. All such elements are interconnected as shown, and individually comprise conventional or known electronic building blocks. For example, the latching switch 290 may be a conventional mechanical relay and the several "time on" and "time out" delays may be conventional time delay relays.

When the microprocessor 250 determines that recording of a message or announcement should start, a RECORD ON pulse is sent to the record subsystem 252 and is applied internally to the latching switch 390. In response, the switch 390 latches into an "on" or high output condition, the high output being applied in parallel to the R/P SELECT line, the "time on" delay 392, the "time out" delay 394, the record amplifier 404 (to turn on the amplifier) and one input of the AND gate 410.

Upon receiving the high output signal from the latching switch 390, the "time out" delay 394 output goes high instantaneously, the high output therefrom being applied in parallel to the pilot oscillator 400 and the "time out" delay 396. The pilot oscillator 400, immediately upon receiving the high signal from the "time out" delay 394, begins to generate a pilot tone which is fed directly to the mixer 406. The pilot tone frequency may, for example, be about 55 hertz for a 1 inch per second recording speed, such as used in the apparatus 164.

At the same time as the pilot oscillator 400 starts generating the pilot tone, the second "time out" delay 396, also imediately in response to the high signal from the first "time out" delay 394, goes high to activate the bias/erase oscillator 402. Output from the bias oscillator 402 is fed in parallel to the mixer 406, to bias a recording signal into linear regions, and to the ERASE IN line directed to the head switcher/motor controller 256.

Accordingly, both the pilot and bias/erase oscillators 400 and 402, respectively, are actuated instantly upon receiving a RECORD ON command from the microprocessor 250.

A measured delay time after receiving a high output from the latching switch 390, the "time on" delay 392 goes high, actuating the AND gate 410 to cause transmittal of a RECORD ENABLE signal back to the microprocessor 250. During the measured delay time of the "time on" delay 392, a pilot tone leader, from the mixer 406, is applied through the SIGNAL IN line to the head switcher/motor controller 256, and thence to whichever of the "A" and "B" tapes 28 and 26 is being recorded upon. The delay length is set for the desired length of pilot tone leader: for example, seven seconds. In this manner, the pilot tone leader is applied for seven seconds before the RECORD ENABLE signal is given.

Upon receiving the RECORD ENABLE signal, which may, for example, cause actuation of the "beep" tone to a caller by the microprocessor 250, a message applied to the MESSAGE IN line is directed to the record amplifier 404. The message signal is amplified by the amplifier 404 and fed into the mixer 406 where it is combined with the pilot and bias/erase oscillator signals for transmittal to the head switcher portion 288 on the SIGNAL IN line. To ensure that pauses within a message are bridged by the pilot tone, so in searching or cueing such pauses will be ignored and not interpreted as inter-record gaps, the amplified message signal is fed from the record amplifier 404 to the record detector 408. Such detector detects peak levels of the recorded signal and provides high output in its presence. This high output is fed to the "time out" delay 398 which provides a high output instantaneously with the high input. At a measured time interval (for example, seven seconds for the answering apparatus 164) after an "off" or low input to the "time out" delay 398, the output thereof goes low, unlatching the switch 390 and terminating the record sequence. The "time out" delay 398 provides for automatically terminating the recording sequence in the event, for example, a caller fails to hang up after leaving a message.

Since the output of the latching switch 390 is combined with the output of the "time on" delay 398 in the AND gate 410, as soon as the latching switch is unlatched, giving a low output, the RECORD ENABLE mode is immediately terminated. Upon termination of the record sequence, the "time out" delay 394, after a measured time interval (about seven seconds in the answering apparatus 164), in turn provides a low output which turns off the pilot oscillator 400. The "time out" delay 394 thus provides a selected length pilot tone trailer after the message.

The low output of the time delay 394 also initiates a time out sequence in "time out" delay 396, so that after a measured time interval the output goes low, turning off the bias/erase oscillator 402. Accordingly, the "time out" delay 394 provides about a seven second erased portion or inter-record gap after the pilot tone trailer.

Figure 10:
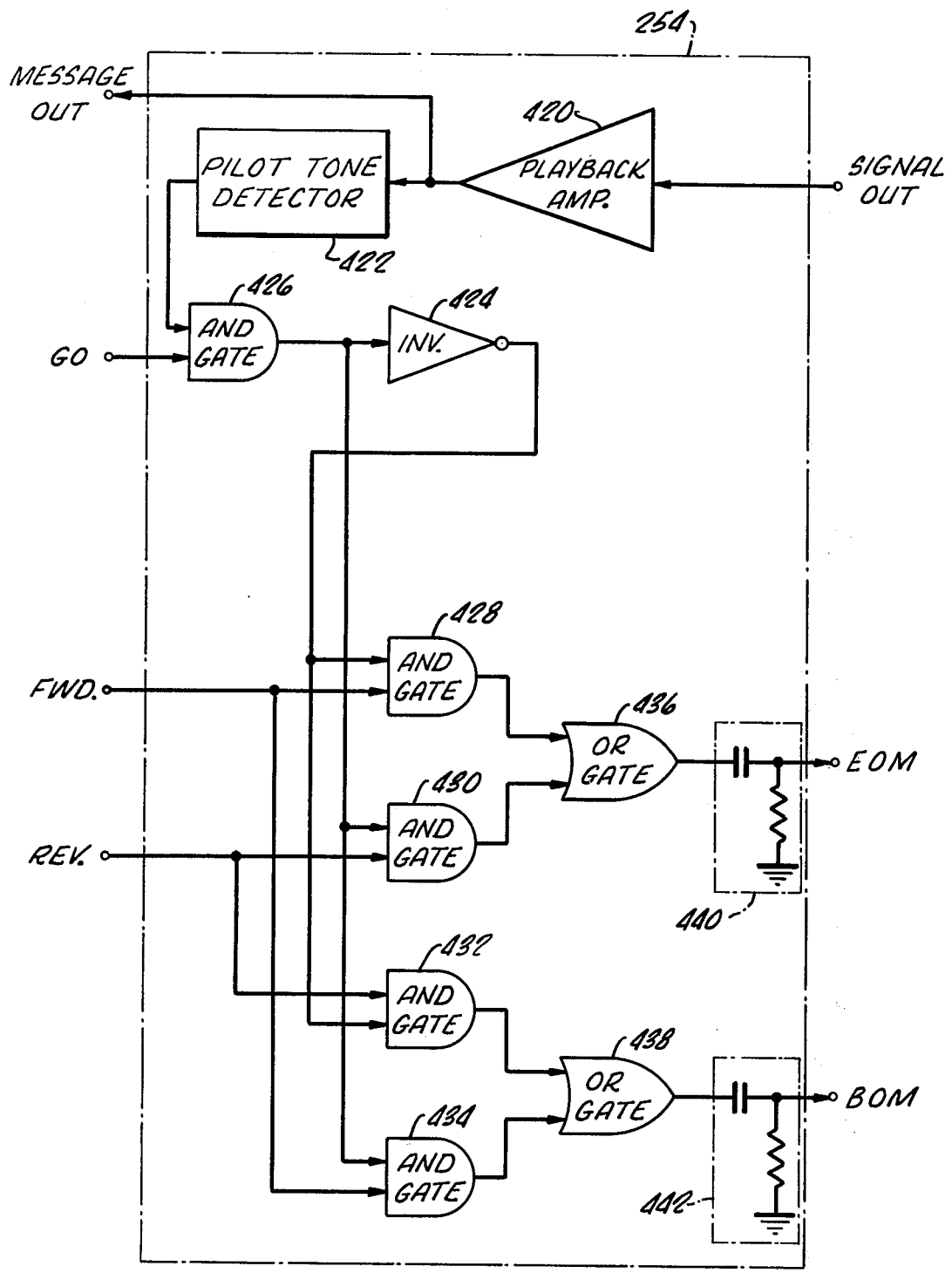
FIG. 10 is a schematic drawing of a playback subsystem of the answering apparatus.

FIG. 10 depicts, in block and logic diagram form, the playback subsystem 254 which includes generally a playback amplifier 420, a pilot tone detector 422, an inverter 424, first through fifth AND gates 426, 428, 430, 432, and 434, first and second OR gates 436 and 438 and first and second RC networks 440 and 444. These elements are interconnected as shown in FIG. 10 and comprise conventional or known elements, the pilot tone detector being, for example, a signal level detector.

In general, and referring also to FIG. 7, the playback subsystem is responsive to GO/FWD/REV. signals from the microprocessor 250, and signals on the SIGNAL OUT line from the head switcher portion 288 and provides MESSAGE OUT, BOM and EOM signals to the microprocessor.

Signals from whichever of the "A" and "B" tapes 28 and 26 is being played are directed to the playback amplifier 420 on the SIGNAL OUT line. The amplified message is fed from the amplifier 420 in parallel on the MESSAGE OUT line to the microprocessor 250 and to the pilot tone detector 422.

In the presence of signal of any type, whether message within the pass band or pilot tone, the output of the detector 422 is high and is fed to the first AND gate 426. Another high input on the GO line from the microprocessor 250 is fed to the gate 426, so that if a message signal is present at the same time as a GO command, the gate output will be high. If the detector 422 output is low in the presence of a GO command, the AND gate 426 output will be low. The latter occurs only during a transition from a "message to no-message" condition; that is, at an inter-record gap.

The output from the first gate 426 is inverted in the inverter 424, the output of which will change from low to high during "message to no-message" transistion. Thus, the output from the first gate 426 will be high in a presence of a message and the output from the inverter 424 will be high in the absence of a message ("no message").

Output of the inverter 424 is fed to the second gate 428 in combination with the FWD. command from the microprocessor 250, which is high when the tape is being driven in the forward (normal R/P) direction. Output of the AND gate 428 will go high in the presence of both an inter-record gap and FWD. command, a transition from low to high will thus occur at the output of the gate 428 only as the tape passes through and end of message (EOM) condition.

Output of the gate 428 is also fed to the third AND gate 430, where it is combined with the REV. command from the microprocessor 250, which is high during the reverse mode. A transistion from low to high from the second gate 428, in the presence of a REV. command, can occur only when the tape is transisting and end of message (EOM) condition in a reverse direction. Thus the output of the third AND gate 430 also indicates an end of message transistion. The end of message transistion outputs of the gates 428 and 430 are combined in the first OR gate 436, whose output will go high if either the first gate 428 or the second gage 430 is high, thereby indicating EOM transistions regardless of tape direction. The function of the first RC network 440 is to provide a pulsed signal whenever the output of the first OR gate 436 shifts between high and low.

Similarly, the fourth and fifth AND gates 432 and 434 combine the beginning of message (BOM) transistions with the FWD. and REV. modes in such a manner that a beginning of message transistion detected in either the forward or reverse direction combines to give a transistion from low to high at the output of the second OR gate 438, making the output thereof similarly independent of tape direction or speed. Again the second RC network provides a pulsed BOM output whenever the output of the second OR gate 438 changes between low and high.

It should be noted that in the discussion immediately above, BOM and EOM actually correspond to beginning and end of the pilot tone, which begins before, and ends after, the actual message on the tape.

A method for minimizing cueing delays in automatic telephone answering apparatus, according to the above description is also provided.

Although there has been described above specific arrangements of recording tape transport apparatus or systems and associated apparatus for use therwith, in accordance with the invention, for the purpose of illustrating the manner in which the invention may be used to advantage, it will be appreciated that the invention is not limited thereto.

For example, one of the two tapes, preferably the second tape 28 in endless loop form, may be a magnetic recording tape, as above described. The first tape 26, in reel-to-reel form, may comprise a photographic film or microfilm strip. Information, indexing or instructions relating to the photographic film or microfilm strip may, accordingly, be recorded on the second tape. As another illustration, the first tape 26, in reel-to-reel form, may comprise a photographic film strip and a second tape, also in reel-to-reel form and mounted and driven, for example, as above described for the first tape 26, and constrained always to be transported simultaneously and in the same direction as the first tape, may comprise a magnetic recording tape on which is recorded a sound track associated with movies on the film strip. In addition more than two tapes may be used.

An advantage in all such applications is that because both (or all) tapes are always constrained to be transported simultaneously, synchronization or registration of information on the tapes is possible, as is necessary in many situations such as movies on one tape (film strip) and a sound track on the other tape.

Accordingly, any and all modification, variations or equivalent arrangements which may occur to those skilled in the art should be considered to be within the scope of the invention as defined in the appended claims.

What is claimed is:

1. Magnetic recording tape apparatus, for use with dual tape cartridges of a type having a tape head access opening in a region thereof, separate first and second magnetic recording tapes, associated bilateral tape transport means for always causing, during tape transport, simultaneous transport of the two tapes across the tape access opening at different levels, and an externally engageable drive member connected to the transport means for enabling operation thereof from an external source, the apparatus comprising:
   (a) cartridge receiving means for receiving a dual tape cartridge,
   (b) reversible tape driver means having driver portions positioned for engaging the drive member of the received cartridge,
   (c) tape head means having first and second tape head portions positioned in operative relationship, respectively, with portions of cartridge first and second tapes at the tape head access opening of the received cartridge, and
   (d) control means connected in operative relationship with the tape head means for controlling operation of the tape driver means and tape head means in response to information received by at least one of the tape head portions from an associated tape of the received dual tape cartridge.

2. An automatic telephone answering recording tape apparatus which comprises:
   (a) tape transport means for containing and transporting magnetic recording tape,
   said transport means including first and second tape hubs and a first magnetic tape having first and second end portions wound, respectively, onto the first and second hubs and having a tape loop extending therebetween, a second magnetic recording tape formed into an endless loop and bidirectional first and second tape transport means for guiding the first tape loop along a first path which traverses a tape head region and the second tape along a second path past which also traverses the tape head region, said first and second tape transport means being configured for causing both tapes always to be transported simultaneously along the respective tape paths whenever one of the tapes is transported, and for always causing one of the tapes to traverse the tape head region in a forward record/playback direction when the other tape traverses the tape head region in a reverse record/play direction,
   (b) tape record/playback means for recording messages on the tapes and playing back messages therefrom, said record/playback means including tape head means positioned at the tape head region in operative relationship with said tapes,
   (c) tape drive means cooperating with said tape means for causing bilateral transporting of the tapes along the respective tape paths and across the tape head region, and
   (d) control means responsive to the record/playback means for energizing the record/playback means and controlling recording and playing back thereby, and energizing the tape drive means and controlling forward and reverse directions of tape drive thereby.

3. The apparatus according to claim 2, wherein the tape head means includes first tape head portions associated with the first tape and second tape head portions associated with the second tape, and wherein the control means includes means for causing switching between said first and second tape head portions for enabling recording on and playing back from the associated tapes.

4. The apparatus according to claim 2, wherein said record/playback means includes pilot tone recording means for recording pilot tone control signals on the tapes as messages are recorded thereon and for at least measured times after recording of the message has stopped and erasing means for causing erasing of measured lengths of the tape immediately following the pilot tone control signals at ends of the messages and detection means for detecting the pilot tones control signals, and thereby detecting beginnings and ends of messages recorded on the tapes, and wherein said control means is responsive to detection of said pilot tone control signals for controlling recording and playing back by the record/playback means and energizing and controlling the tape drive means.

5. The apparatus according to claim 4, wherein the control means is operative, after a message is played back from the second tape, for causing the drive means to transport the first tape in a reverse record/playback direction and the detecting means to search the first tape for the pilot tone control signals at the end of the nearest message recorded thereon.

6. The apparatus according to claim 7, wherein the control means is operative, when recording of a message on the first tape is completed, for causing the drive means to transport the second tape in a reverse/record direction and the detecting means to search the second tape pilot tone control signals associated with the beginning of a message recorded thereon.

7. A method for minimizing cueing delays in an automatic telephone answering apparatus, which comprises the steps of:
   (a) forming a tape cartridge having a first, reel-to-reel message recording tape and a second, endless loop announcement recording tape,
   (b) mechanically constraining the two tapes always to be transported simultaneously when one is transported and always to be transported in opposite record/playback directions past a tape head access opening,
   (c) installing the cartridge in a tape transport apparatus having tape head means positioned at the tape head access opening and having means for transporting the tapes in forward and reverse record/-playback directions,
   (d) recording an announcement on the second tape in the forward record/playback direction,
   (e) rewinding the first tape and recording a caller message on the first tape in the forward record/-playback direction,
   (f) preparing the apparatus for a next call by continuing transport of the first tape in a forward record/-playback direction for a period of time ensuring that, when the announcement is subsequently played to a next caller, the end of the message will be beyond, in the forward record/playback direction, the tape head means, (g) searching the second tape in the reverse record/playback direction until the beginning of the announcement is found, transporting of the first tape in the forward record/playback direction thereby being continued, and stopping, until a next call is received, transport of both tapes when the beginning of the announcement is found, (h) playing the second tape announcement in the forward record/playback direction to the next caller, transporting of the first tape in the reverse record/playback direction thereby continuing, (i) searching the first tape in the reverse record/playback direction until the end of the message is found, and (j) cueing the next caller to start giving a next message.

8. The method according to claim 7, wherein the step of searching the first tape until the end of the message is found includes transporting the first tape, during searching, at a speed substantially greater than a normal record/playback speed.

9. The method according to claim 7, including the step of recording during, and for measured times before and after, the announcement and all messages a pilot tone control signal, and after the end of the pilot control tones at the ends of the announcement and messages, erasing a measured length of the tapes for assisting in searching for the beginning of the announcement and ends of the messages.

10. Magnetic recording tape apparatus, for use with dual tape cartridges of a type having a tape head access opening in a region thereof, separate first and second magnetic recording tapes, associated bilateral tape transport means for always causing, during tape transport, simultaneous transport of the two tapes across the tape access opening at different levels and always in opposite directions and an externally engageable drive member connected to the transport means for enabling operation thereof from an external source, the apparatus comprising:

(a) cartridge receiving means for receiving a dual tape cartridge;

(b) reversible tape driver means having driver portions positioned for engaging the drive member of the received cartridge;

(c) tape head means having first and second tape head portions positioned in operative relationship, respectively, with portions of cartridge first and second tapes at the tape head access opening of the received cartridge; and (d) control means connected in operative relationship with the tape head means for controlling directional operation of the tape driver means and operation of tape head means in response to information received by at least one of the tape head portions from an associated tape of the received dual tape cartridge.

* * * * *